3,058,603
SUPPORTING AND CARRYING FRAME FOR FREIGHT CONTAINERS AND THE LIKE

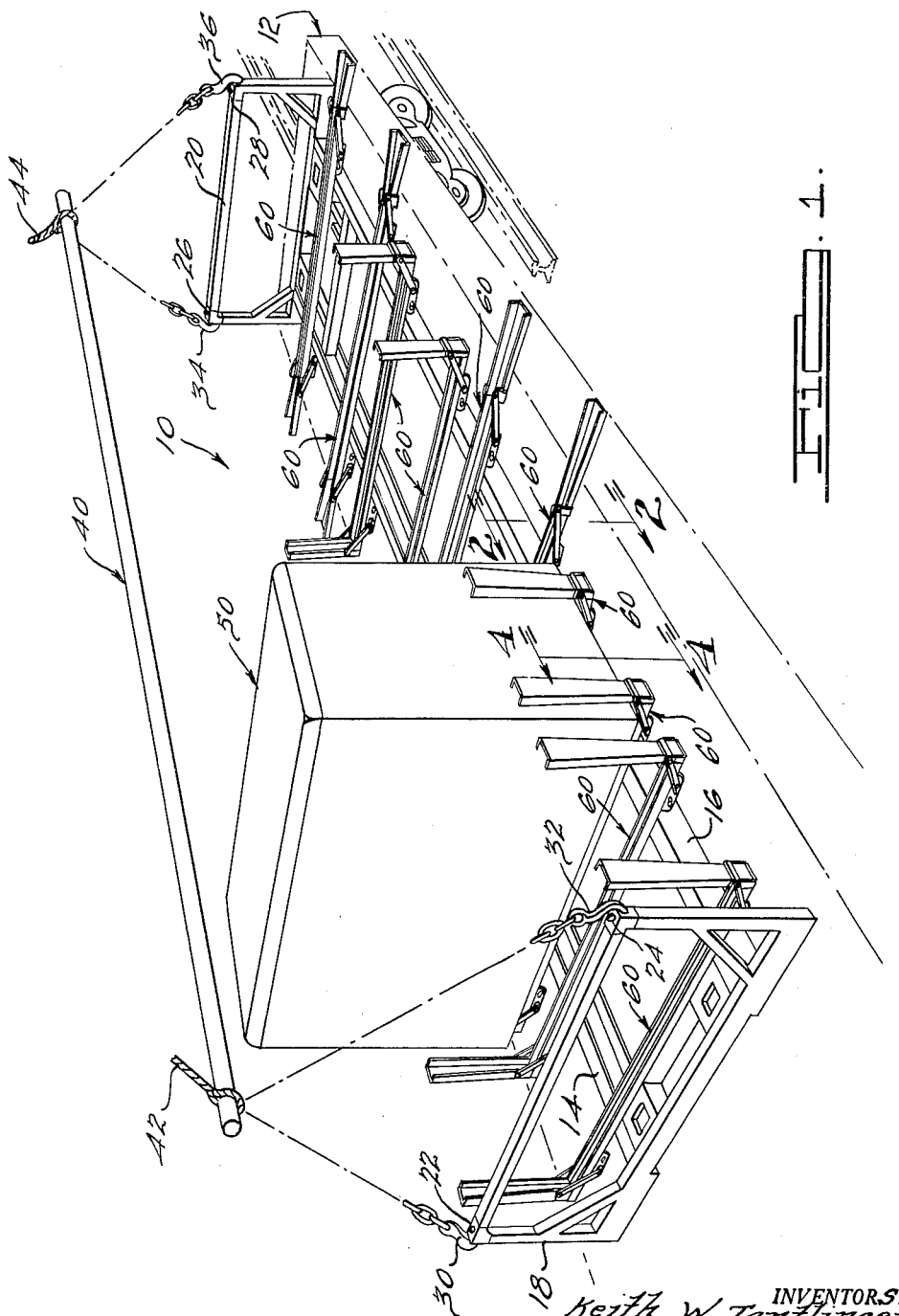

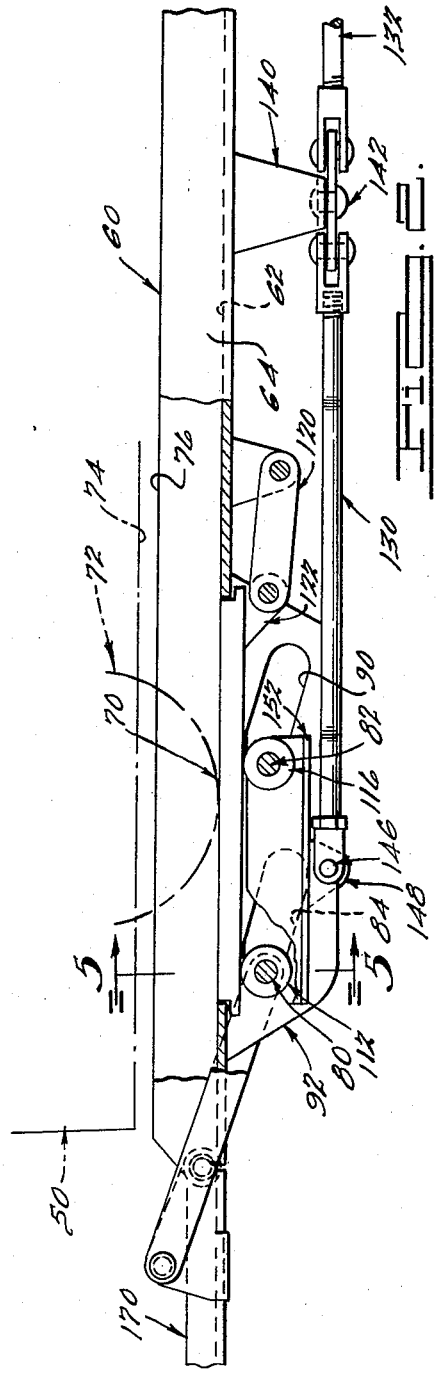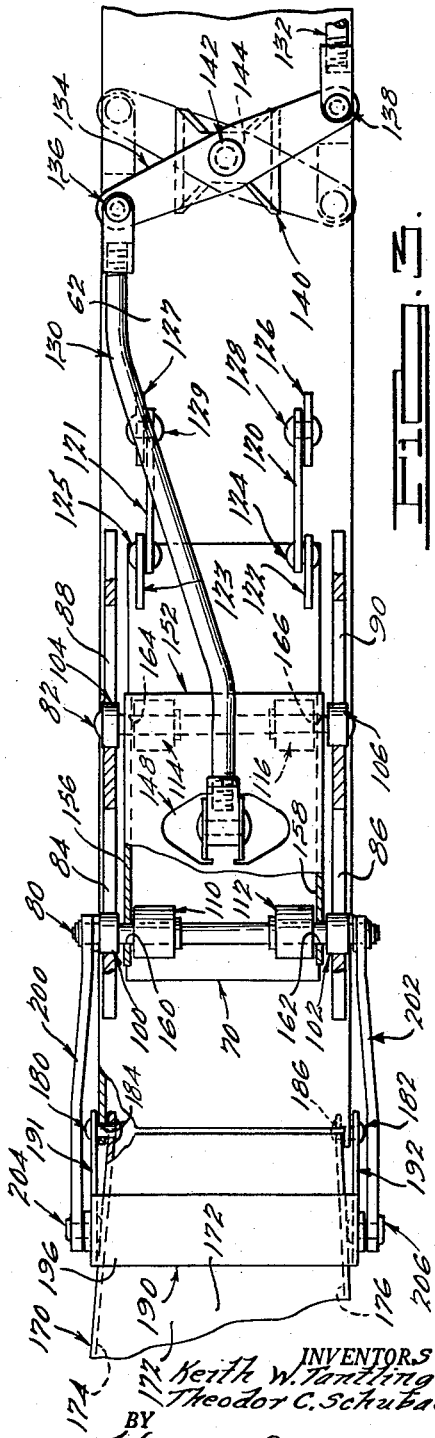

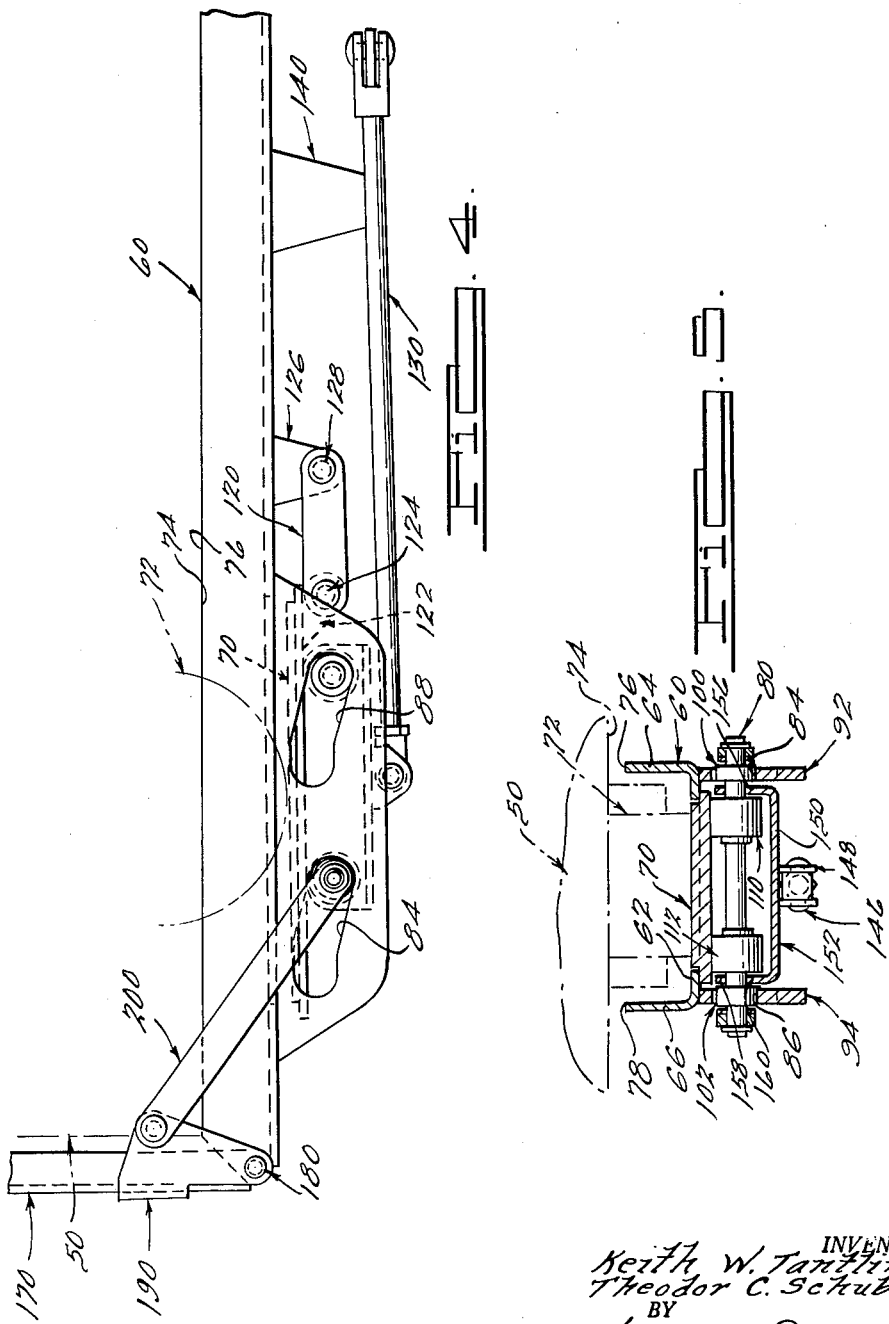

Keith W. Tantlinger, Grosse Pointe Shores, and Theodor C. Schubach, Detroit, Mich., assignors to Fruehauf Trailer Company, Detroit, Mich., a corporation of Michigan
Filed Feb. 14, 1961, Ser. No. 89,158
7 Claims. (Cl. 214—85)

This invention relates generally to freight handling apparatus and more particularly to a supporting and carrying frame for freight containers.

There are many advantages to shipping freight or packaged goods in containers of modular dimensions. Such shipping containers implement the transfer of goods in that standardized equipment can be provided for handling, the cubic volume of the container is known, which facilitates loading thereof and, when loaded, such containers are relatively easily spotted and stacked on, for example, a wheeled vehicle or ship.

One obvious problem associated with the use of such shipping containers is that they are relatively large and, in the absence of some form of handling aid, would be relatively difficult to handle. This problem has been solved by supporting the containers on integrally housed rollers which facilitate movement of the containers about, for example, a loading dock and between the loading dock and a transfer vehicle.

However, the use of such rollers, which solves one problem, raises another in that the containers cannot be shipped with the weight thereof resting on the rollers. The constant shaking and abuse to which such containers are normally subjected while in transit or, for example, when railway cars are humped during assembly of a train, would soon render the rollers inoperative. In addition, as long as the containers are supported on rollers, they are relatively easily movable and therefore are difficult to tie down securely for the purpose of shipment.

The foregoing problems associated with the shipment of roller mounted containers, as well as the problem of transferring such containers between, for example, a shipping dock and a rail car, or other vehicle, is solved in accordance with the present invention by a novel supporting and carrying frame that accepts a plurality of the shipping containers. The carrying frame is adapted to accommodate a plurality of the shipping containers and includes a novel ramp construction that facilitates movement of the containers from, for example, a loading dock onto the frame. Movement of the loading ramps to a shipping condition effects concomitant lowering of the containers into a position wherein they are directly supported by the frame thereby relieving the weight of the containers from the rollers.

The frame itself is of such a dimension and construction that it accepts a plurality of the shipping containers yet is readily acceptable upon conventional railway flat cars, trailers or the like. The frame is provided with suitable holddown apparatus and includes means for the acceptance of conventional spreader bars and the like.

Accordingly, one object of the present invention is a means for implementing the shipment of freight containers.

Another object is an improved supporting and carrying frame for freight containers.

Another object is a supporting frame for freight containers having rollers on the bottom thereof that removes the weight of the containers from the rollers during shipment.

Another object is a frame for freight containers having means for accepting the containers in roll-on relationship and means for relieving the weight on the rollers.

Another object is a frame for freight containers having a collapsible ramp to facilitate loading of the containers on the frame.

Another object is a frame for shipping containers having a ramp and means for relieving the weight of the containers from the rollers upon movement of the ramp to a shipping condition.

Other objects and advantages of the present invention will be apparent in the following specification, claims and drawings wherein:

FIGURE 1 is a perspective view of a supporting and carrying frame for freight containers shown in association with a flat bed railway car and having a freight container operatively mounted thereon;

FIG. 2 is a cross sectional view taken substantially along the line 2—2 of FIGURE 1;

FIG. 3 is a bottom view of the structure of FIG. 2;

FIG. 4 is a cross-sectional view taken substantially along the line 4—4 of FIGURE 1; and FIG. 5 is a view taken substantially along the line 5—5 of FIG. 2.

A supporting and carrying frame 10, in accordance with an exemplary embodiment of the present invention, is shown in operative association with a conventional flat bed railway car 12. The frame 10 may be secured to the railway car 12 by any suitable means, for example, holddown bolts (not shown). The frame 10 comprises a pair of longitudinal beams 14 and 16 that are joined by a pair of vertically orientated generally rectangular frames 18 and 20 at opposite ends thereof. The end frame 18 has suitable apertures 22 and 24, and the frame 20 has suitable apertures 26 and 28 for the acceptance of complementary hooks 30, 32, 34 and 36, respectively, on a lifting sling 40. The lifting sling 40 is suspended as by cables 42 and 44 from a loading boom (not shown) of, for example, a ship or loading crane.

The frame 10 is adapted to accommodate one or more shipping containers 50, the disclosed exemplary embodiment of the frame 10 having provision for the acceptance and support of five such containers 50.

In accordance with one feature of the present invention, each of the containers 50 is supported on a pair of spaced transversely extending aligned trackways 60 that are secured to the longitudinal frame members 14 and 16 as by welding. The trackways 60 are of U-shaped transverse cross section defined by a web portion 62 (FIG. 5), and upstanding flange portions 64 and 66. Because the trackways 60 are identical in construction, only one trackway 60 will be described in detail hereinafter.

In accordance with the present invention, each of the trackways 60 has a pair of spaced elevator sections 70 at opposite ends thereof for the acceptance and support of aligned ones of the wheels 72 of the containers 50. The elevators 70 are spaced longitudinally of the trackways 60 in accordance with the longitudinal spacing of the wheels 72 on the containers 50 so that, upon lowering of the elevators 70, a lower edge or bottom surface 74 of the containers 50 comes into engagement with the upper edge faces 76 and 78 (FIG. 5) on the flange portions 64 and 66 of the trackways 60, respectively, thereby to relieve the weight of the containers 50 from the rollers 72.

Raising and lowering of the elevator sections 70 of the trackways 60 is effected upon movement of a pair of roller shafts 80 and 82 longitudinally of the trackway 60. The roller shafts 80 and 82 extend through aligned pairs of angularly orientated slots 84—86 and 88—90 in a pair of downwardly depending flanges 92 and 94, respectively, that are secured to the web portion 62 of the trackway 60, as by welding. It is to be noted that the slots 84, 86, 88 and 90 slope upwardly longitudinally outwardly of the trackway 60, terminating in a generally horizontal section at the outboard extremity thereof.

The roller shafts 80 and 82 support pairs of rolls 100—102 and 104—106, respectively, that are engageable in the slots 84, 86, 88 and 90, respectively, so that the shafts 80 and 82 are raised and lowered upon movement thereof longitudinally of the slots 84, 86, 88 and 90.

The shafts 80 and 82 also support a plurality of rollers 110—112 and 114—116, respectively, that are engageable with the underside of the elevator section 70. Therefore, movement of the shafts 80 and 82 longitudinally inwardly of the trackway 60 effects a lowering of the elevator sections 70 and containers 50.

The elevator section 70 is restrained against longitudinal movement with respect to the trackway 60 by a pair of links 120 and 121 that are secured to downwardly extending brackets 122 and 123 on the elevator section 70 as by pins 124 and 125 to downwardly extending brackets 126 and 127 on the trackway 60 as by pins 128 and 129, respectively. The links 120 and 121 thus guide the elevator 70 for what is essentially vertical translation in response to movement of the rollers 110, 112, 114 and 116.

In accordance with another feature of the present invention, the elevators 70, at opposite ends of each of the trackways 60, are connected for vertical concurrent movement by a pair of connecting rods 130 and 132 that are connected to a center link 134 as by a pair of pins 136 and 138, respectively. The center link 134 is pivotally supported on a downwardly extending generally U-shaped bracket 140 that is secured to the web portion 62 of the trackway 60 as by welding. A pin 142 extends vertically of a bight portion 144 of the bracket 140 to support the yoke 134 for rotation about a generally vertical axis.

As best seen in FIGS. 2, 3 and 5, movement of the rods 130 and 132 is transmitted through a pin 146 to a downwardly extending bracket 148, the bracket 148 being secured to a bight portion 150 of a generally U-shaped shaft retainer 152. The shaft retainer 152 has upstanding leg portions 156 and 158 (FIG. 3) with suitable apertures 160, 162, 164 and 166 therein for the acceptance of the shafts 80 and 82, respectively. Thus, it will be seen that the rotation of the yoke 134 about the pin 142 effects axial movement of the rod 130 which is transmitted to the shaft retainer 152 thereby to move the shafts 80 and 82 longitudinally of the trackway 60 and effect elevation and lowering of the elevator 70 as the rollers 100, 102, 104 and 106 move in the inclined slots 84, 86, 88 and 90, respectively.

In accordance with yet another feature of the present invention, the opposite end portions of the trackways 60 are provided with foldable ramps 170. The ramps 170 are similar in construction, therefore only one of the ramps 170 will be described hereinafter.

Each ramp 170 comprises a generally U-shaped channel member defined by a bight portion 172 and upstanding leg portions 174 and 176 (FIG. 3). The ramp 170 is pivotally supported at an inner end portion thereof by a pair of pins 180 and 182 that extend through complementary apertures 184 and 186 in the upstanding flange portions 64 and 66 of the trackway 60, respectively.

A generally U-shaped ramp yoke 190, having leg portions 191 and 192, is pivotally supported by the pins 180 and 182, a bight portion 196 thereof being engageable with the ramp 170. It is to be noted that the yoke 190 is movable in rotation about the pins 180 and 182 independently of movement of the ramp 170 so that if one of the ramps 170 is restrained in the vertical position, as shown in FIG. 4, its associated yoke 190 is movable to the downward position due to elevation of the elevator 70. This feature provides for unloading of the container 50 from a dock wherein access to the frame 10 is provided on only one side thereof, clearance on the other side thereof being inadequate to permit lowering of the opposite ramp 70.

Movement of the elevator 70 is transmitted to the ramp yoke 190 by a pair of toggle links 200 and 202 that are secured to the ramp yoke 190 by a pair of pins 204 and 206 and to the shaft 80 for concomitant movement therewith. Thus, it will be seen that rotation of the yoke 134 effects reciprocation of the rod 130 which is transmitted to the shaft retainer 152 to move the shafts 80 and 82 longitudinally of the slots 84, 86, 88 and 90, whereupon the rollers 100, 102, 104 and 106 move upwardly in the slots. Movement of the shaft retainer 152 is transmitted to the ramp yoke 190 by links 200 and 202, thereby to effect lowering and raising of the ramp yoke 190, permitting the ramp 170 to be lowered or effecting elevation thereof, as desired.

In accordance with yet another feature of the present invention, it is to be noted that downward movement of the ramp 170 biases the ramp yoke 190 downwardly from the position shown in FIG. 4 to the position of FIG. 2, which motion is transmitted to the opposite elevator 70 by the aforementioned linkage. Thus, elevation of the shipping containers 50 is rendered relatively easy by pulling downwardly on the outer end of the ramp 170, maximum leverage being afforded by the aforementioned toggle system. Thus, the carrying frame of the present invention effects raising and lowering of the shipping containers 50 upon movement of the ramp 170 to a loading and shipping condition. The ramps 170 may be held in a shipping condition as by suitable locks 220 on the containers 50 (FIGURE 1), thereby to preclude movement of the containers 50 relative to the frame 10.

From the foregoing description, it should be apparent that the present invention effects lowering of a section of a container supporting frame to transfer the weight of the containers from the rollers thereof to the frame upon raising of the ramps used to transport the containers between a dock facility and the supporting frame. Coupling of these components is effected by a relatively simple mechanical linkage that affords a relatively great mechanical advantage to facilitate raising of the container to a discharge condition. Also, the linkage between the ramp and the elevatable sections of the frame provides for loading and unloading of the containers from, for example, a rail facility that permits access to only one side of the shipping containers.

Stated in another manner, movement of the loading ramps to the shipping condition concomitantly relieves the weight of the shipping containers from the rollers thereof, thereby to condition the containers for shipment. This novel cooperation between a loading ramp and an elevatable section of a container supporting frame expedites transfer of the shipping containers between a dock facility and a transport vehicle to a heretofore unknown degree.

It is to be understood that the specific construction of the improved supporting and carrying frame for freight containers and the like herein disclosed and described is presented for the purpose of explanation and illustration and is not intended to indicate limits of the invention, the scope of which is defined by the following claims.

What is claimed is:

1. In a supporting and carrying frame for roller mounted freight containers, the improvement comprising ramp means for rollably accepting the rollers of the container and movable between an accepting and shipping condition, selectively, elevator means for rollably accepting the rollers of the container and movable between an accepting and a shipping condition, and means coupling said ramp and elevator means for concomitant movement between the accepting and shipping conditions, movement of said elevator means to the shipping condition relieving the weight of the container from the rollers thereof, movement of said elevator means from the shipping condition to the accepting condition transferring the weight of the container to the rollers thereof.

2. In a supporting and carrying frame for roller mounted freight containers, the improvement comprising a plurality of ramps for rollably accepting the rollers of the container, said ramps being movable between an accepting and shipping condition, selectively, a plurality of tracks on the frame for rollably accepting the rollers of the container, elevator sections on said tracks, respectively, under each of the rollers on the container, said elevator sections being movable vertically between an accepting and a shipping condition, and a mechanical linkage coupling said ramps and elevators, respectively, for concomitant movement between the accepting and shipping conditions, movement of coupled ones of said ramps and elevators to the shipping condition relieving the weight of the container from the rollers of the container, movement of said ramps and elevators from the shipping condition to the accepting condition transferring the weight of the container to the rollers of the container.

3. In a supporting and carrying frame for freight containers having a pair of axially spaced rollers thereon, the improvement comprising a pair of ramps for rollably accepting respective ones of the rollers of the container, said ramps being rotatable between a generally horizontal accepting condition and a generally vertical shipping condition, a pair of tracks on the frame aligned with said ramps, respectively, for rollably accepting the rollers of the container, elevator sections on said tracks, respectively, the rollers of the containers being positionable on said elevator sections, respectively, means for moving said elevator sections vertically between an accepting and a shipping condition, and mechanical linkages coupling aligned ones of said ramps and elevators, respectively, for concomitant movement between the accepting and shipping conditions, movement of coupled ones of said ramps and elevators to the shipping condition relieving the weight of the container from the rollers of the container, movement of coupled ones of said ramps and elevators from the shipping condition to the accepting condition transferring the weight of the container to the rollers of the container.

4. In a supporting and carrying frame for freight containers having a bottom surface and a pair of axially spaced rollers extending below the surface, the improvement comprising a pair of ramps for rollably accepting respective ones of the rollers of the container, said ramps being rotatable between a generally horizontal accepting condition and a generally vertical shipping condition, a pair of generally U-shaped tracks on the frame aligned with said ramps, respectively, for rollably accepting the rollers of the container, the U-shaped configuration of said tracks being defined by a pair of spaced upwardly extending flange sections with a bight portion therebetween, elevator sections in the bight portions of said tracks, respectively, the rollers of the containers being positionable on said elevator sections, respectively, means for moving said elevator sections vertically between an accepting and a shipping condition, and means coupling aligned ones of said ramps and elevators, respectively, for concomitant movement between the accepting and shipping conditions, movement of coupled ones of said ramps and elevators to the shipping condition transferring the weight of the container from the rollers of the container and elevator sections of the track to the bottom of the container and the flange sections of the track.

5. In a supporting and carrying frame for freight containers having a bottom surface and spaced pairs of axially spaced rollers extending below the surface, the improvement comprising a pair of spaced ramps for rollably accepting respective axially spaced ones of the rollers of the container, said ramps being pivoted on the frame for rotation between a generally horizontal accepting condition and a generally vertical shipping condition, a pair of spaced generally U-shaped tracks on the frame aligned with said ramps, respectively, for rollably accepting the rollers of the container, the U-shaped configuration of said tracks being defined by a pair of spaced upwardly extending flange sections with a bight portion therebetween, spaced pairs of elevator sections in the bight portions of said tracks, respectively, for the acceptance of the rollers of the container, means for moving said elevator sections vertically between an accepting and a shipping condition, and means coupling aligned ones of said ramps and the moving means for said elevators, respectively, for concomitant movement between the accepting and shipping conditions, movement of coupled ones of said ramps and elevators to the shipping condition transferring the weight of the container from the rollers of the container and elevator sections of the track to the bottom of the container and the flange sections of the track.

6. The supporting and carrying frame of claim 5 wherein said coupling means comprises a lost motion connection to provide for movement of said elevators to the accepting condition without requiring movement of said ramps to the accepting condition.

7. The supporting and carrying frame of claim 6 wherein said lost motion connection comprises a toggle to increase the mechanical advantage between said ramp and elevator to facilitate movement of said elevators to the accepting condition upon movement of said ramp to the accepting condition.

References Cited in the file of this patent

UNITED STATES PATENTS

| | | |
|---|---|---|
| 808,166 | McGann | Dec. 26, 1905 |
| 2,411,133 | Hill | Nov. 12, 1946 |
| 2,524,664 | Henderson et al. | Oct. 3, 1950 |
| 2,693,286 | Cocks | Nov. 2, 1954 |
| 2,812,080 | Campos | Nov. 5, 1957 |